(12) United States Patent
Yamamoto et al.

(10) Patent No.: US 6,442,110 B1
(45) Date of Patent: Aug. 27, 2002

(54) BEAM IRRADIATION APPARATUS, OPTICAL APPARATUS HAVING BEAM IRRADIATION APPARATUS FOR INFORMATION RECORDING MEDIUM, METHOD FOR MANUFACTURING ORIGINAL DISK FOR INFORMATION RECORDING MEDIUM, AND METHOD FOR MANUFACTURING INFORMATION RECORDING MEDIUM

(75) Inventors: Masanobu Yamamoto, Kanagawa; Toshiyuki Kashiwagi, Tokyo; Shingo Imanishi, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/385,956

(22) Filed: Aug. 30, 1999

(30) Foreign Application Priority Data

Sep. 3, 1998 (JP) .................................. 10-249880

(51) Int. Cl.$^7$ ................................................ G11B 7/12
(52) U.S. Cl. ................................ 369/44.23; 369/44.28; 369/112.08; 369/112.24

(58) Field of Search ................... 369/44.11, 44.12, 369/44.14, 44.23, 44.28, 44.37, 112.01, 112.08, 112.13, 112.2, 112.23, 112.24, 112.26

(56) References Cited

U.S. PATENT DOCUMENTS 5,712,842 A * 1/1998 Yamamoto et al. .. 369/44.23 X

* cited by examiner

Primary Examiner—Muhammad Edun
(74) Attorney, Agent, or Firm—Sonnenschein, Nath & Rosenthal

(57) ABSTRACT

A beam irradiation apparatus includes a beam generation source (41) for generating at least either of an optical beam, an electron beam and an ion beam, and a focusing lens (48) for focusing a beam emitted from the beam generation source (41). The beam irradiation apparatus includes at least first and second focus control mechanisms (71) and (72) each controlling a focus position of the beam with respect to the same lens system forming the focusing lens, so as to focus the beam onto an irradiation object (40) by using the focusing lens (48), whereby it possible to obtain a minute beam spot and to conduct a reliable, and stable focus control.

32 Claims, 9 Drawing Sheets

BEAM IRRADIATION APPARATUS, OPTICAL APPARATUS HAVING BEAM IRRADIATION APPARATUS FOR INFORMATION RECORDING MEDIUM, METHOD FOR MANUFACTURING ORIGINAL DISK FOR INFORMATION RECORDING MEDIUM, AND METHOD FOR MANUFACTURING INFORMATION RECORDING MEDIUM

RELATED APPLICATION DATA

The present application claims priority to Japanese Application No. P10-249880 filed Sep. 3, 1998 which application is incorporated herein by reference to the extent permitted by law.

BACKGROUND OF THE INVENTION

1. Field of the Invention

The present invention relates to a beam irradiation apparatus, an optical apparatus having a beam irradiation apparatus for an information recording medium, a method for manufacturing an original disk for an information recording medium, and a method for manufacturing an information recording medium.

2. Description of the Related Art

As information recording media, there are CD-ROMs (Compact Disk—Read Only Memories), so-called CD-Rs, and recordable disks such as magneto optical disks. FIG. 8 shows a perspective view of such a recording medium. Each of FIGS. 9A and 9B is a schematic oblique view of a principal part showing sections of a part of an optical disk. On a signal recording region 2 formed on a disk substrate 1, minute concaves and convexes 18 are formed as shown in FIGS. 9A and B. The minute concaves and convexes 18 are formed by, for example, continuous grooves 3 as shown in FIGS. 9A. Alternatively, a sequence of pits 4 are spirally formed on each of tracks having a predetermined track pitch, for example, in the range of 1 $\mu$m to 2 $\mu$m.

On a signal recording surface having the minute concaves and convexes formed thereon, a light reflection film or a protection film is formed, in the case of, for example, CD-ROMS. In the case of recordable optical disks of phase change type, magneto optical recording type or the like, a recording layer using a phase change film or a magnetic film is formed on the signal recording surface having the minute concaves and convexes formed thereon, and a light reflection film and a protection film are formed thereon.

For example, in the above described recordable optical disks, the so-called lands interposed between the grooves 3 are typically used as a recording section, and the grooves 3 are used as a light reflection section for tracking.

Reproduction from such an information recording medium such as an optical disk and optical recording onto a recordable optical disk are conducted by irradiating a laser light typically from a rear surface of the substrate 1 opposite to the recording surface while rotating the disk.

For example, in the CD-ROM used exclusively for reproduction, information readout and tracking are conducted by detecting a reflected light or diffracted light coming from the pit 4.

In the recordable optical disk, information is optically written (recorded) on the recording layer located, for example, on the land portion by irradiation a laser light. By using a reflected light, readout (reproduction) of the recorded information is conducted. In order to irradiate a laser light for recording or reproduction always onto a predetermined track, a reflected light from, for example, the groove 3 is detected and tracking is effected.

As for the formation of the above described minute concaves and convexes, they are molded simultaneously with the molding of the disk substrate 1 by, for example, the injection molding. Alternatively, for example, an ultraviolet ray setting resin layer is formed on the disk substrate 1 by coating, and minute concaves and convexes are formed thereon. The latter method is the so-called 2P method (Photo Polymerization method) or the like.

In either of the injection molding method and the 2P method, a stamper having minute concaves and convexes inverted in pattern as compared with the minute concaves and convexes formed on the disk substrate 1 is used. For example, in the case of the injection molding, the stamper having the above described inverted pattern is disposed in a cavity of a molding die, and a disk substrate having concaves and convexes transferred from the stamper is molded by the injection molding of resin. In the case of the 2P method, there are included the steps of pressing the stamper against, for example, an ultraviolet ray setting resin layer coated onto the disk substrate, forming thereby minute concaves and convexes, then conducting cure using irradiation of ultraviolet rays, and thus forming a disk having minute concaves and convexes transferred from the stamper.

A method for fabricating such a stamper having minute concaves and convexes formed thereon will now be described by referring to perspective views in respective steps shown in FIG. 10A to FIG. 10C. In this case, an original disk is first fabricated. As for the fabrication of this original disk, a disklike substrate 11, such as a glass substrate, serving as a substrate of the original disk and having a smoothed mirror surface is prepared as shown in FIG. 10A.

Onto the smooth mirror surface of this substrate 11, a photoresist layer 12 containing, for example, positive photoresist is coated by using the rotation coating method or the like so as to have a required thickness, such as a thickness of 0.1 $\mu$m as shown in FIG. 10B.

Then, this photoresist layer 12 is objected to a required pattern exposure. In other words, while the substrate 11 is being rotated around its center axis as shown in FIG. 10C, a laser beam 20 is focused onto the photoresist layer 12 by a focusing lens 21, and irradiated while it is relatively moved in the radial direction of the substrate 11. A latent image of minute concaves and convexes, i.e., a latent image 22 of a groove or pit is formed along a spiral line.

The photoresist layer 12 thus objected to the pattern exposure is developed. By doing so, there is obtained an information recording medium having minute concaves and convexes 13 each comprised of a groove or a pit formed by removing the photoresist layer 12 according to a predetermined exposure pattern. In this example, an original disk 14 for manufacturing optical disks is obtained. FIG. 11A or B shows a partial perspective view thereof.

By using the original disk 14 thus formed, a stamper is fabricated. As for the fabrication of the stamper, a metal layer 15 is formed on the surface of the original disk 14 having minute concaves and convexes 13 formed thereon by using a Ni plating as shown in FIG. 12A. The metal layer 15 is exfoliated from the original disk 14. By doing so, a stamper 17 comprised of the metal layer 15 having minute concaves and convexes 16 formed by inverting in pattern the minute concaves and convexes 13 of the original disk 14 is formed as shown in FIG. 12B.

By using the stamper 17 thus formed, it is possible as shown in FIGS. 13A and 13B to obtain an optical disk, i.e., an information recording medium 19, having minute concaves and convexes 18 inverted in pattern as compared with the minute concaves and convexes 16 of the stamper 17, i.e., having grooves 3 and pits 4 shown in FIG. 9A and FIG. 9B, by using the above described injection molding or 2P method.

In this case, the stamper 17 has been formed from the original disk 14 by the Ni plating. An alternative method includes the steps of fabricating a so-called master from the original disk 14 by the Ni plating, fabricating a so-called mother by transferring the master, and fabricating a stamper by transfer from the mother.

An exposure apparatus, i.e., a beam irradiation apparatus, used in the exposure process for the photoresist layer 12 has a schematic configuration as shown in FIG. 14. There is provided a beam generation source 31 for generating a laser light, to which the photoresist layer 12 is exposed. The laser light emitted from the beam generation source 31 is focused and irradiated on the photoresist layer 12 of the substrate 11 to be exposed, via a mirror 32, a condenser lens 33, a modulator 34, a collimator lens 35, mirrors 36 and 37, and an objective lens, i.e., a focusing lens 21.

With respect to the irradiation object, the beam irradiation apparatus conducts a light intensity modulation of the beam, or concretely turns on and off the beam, by using the modulator 34 according to the latent image of the minute concaves and convexes to be finally obtained, i.e., corresponding to the exposure pattern. As this modulator 34, an acousto-optic modulator (AOM) using, for example, an optical crystal can be employed.

In the modulator 34 using the AOM, a compressional wave of a refractive index is formed in the optical crystal by making an ultrasonic wave incident on the optical crystal. With respect to a diffraction grating formed by the compressional wave, an incident laser beam which has been incident at an angle satisfying the Bragg condition is objected to Bragg diffraction. There is thus obtained, for example, a primary diffracted light diffracted with a predetermined diffraction angle with respect to 0th light transmitted as a transmitted light as it is. The light intensity of this diffracted light depends upon the intensity of the ultrasonic wave which is incident on the crystal. In other words, selection as to whether or not the diffracted light is present can be conducted by turning on or off the ultrasonic wave. By using this primary diffracted light as the exposure laser beam, therefore, it is possible to conduct intensity modulation of the exposure laser beam, i.e., turn on or off the exposure laser beam according to control of the ultrasonic wave, i.e., according to turning on or off the ultrasonic wave.

As the recording density of information recording media such as optical disks is increased in recent years, how small the above described minute concaves and convexes, i.e., pits and grooves are formed has become a great problem.

In one method of solving this problem, the exposure spot diameter, i.e., the condensed spot diameter is made small. This spot diameter $\phi$ is given by $$\phi = 1.22 \lambda / N.A$$

where N.A. is the numerical aperture of the focusing lens (objective lens), and $\lambda$ is the wavelength of light. For making the spot diameter $\phi$ small, therefore, a light having a short wavelength is used, or a focusing lens having a large N.A. is used.

As for the N.A. among them, the refractive index around the condensed point can be made large by employing a focusing lens using a SIL (Solid Immersion Lens). Therefore, its N.A. can be made equal to or more than 1.0.

In this SIL, one of its principal faces is, for example, a hemispherical face, and the other of its principal faces is a plane. By making a laser beam incident on the hemispherical face, a condensed spot can be formed on the plane.

Since the refractive index at the condensed point becomes the refractive index of the SIL, the diameter of the condensed spot can be made sufficiently small. If, for example, a laser beam focused by a lens having an N.A. of 0.9 is incident on the hemispherical face of the SIL having the reflective index of 2.0 while maintaining the focusing angle, then a spot formed on its plane side becomes equivalent to that focused by a lens having a N.A. of 1.8. In other words, the diameter of the condensed spot can be made small by using the SIL.

When a condensed spot is formed outside the plane side of the SIL in the case where a laser beam is condensed by using this SIL, however, a component having a large focusing angle included in the focused beam is totally reflected on this plane and is not emitted to the outside. In this case, therefore, the condensed spot formed outside the SIL becomes the same as that of a lens having a N.A. equal to or less than 1.0. In the case where the SIL is used, a light irradiation object such as the exposed surface must be kept in such a position that physically it is not in contact with the plane face of the SIL, but optically it is in contact therewith. In other words, the exposed surface must be kept in such a position that the amplitude of the optical wave does not become 1/10 in the so-called near-by field region, i.e., in the light oozing region for the plane. In other words, the exposed surface must be kept in such a position that the distance between the exposed surface and the plane face of the SIL is equal to or less than $$\frac{\lambda \cdot \log_e 10}{2\pi \sqrt{(N.A.)^2 - 1}}$$

For example, when the N.A. is 1.8, the exposed surface must be disposed in such a position that an extremely minute distance equal to approximately one fourth of the wavelength $\lambda$ is kept.

When a beam having $\lambda$ of approximately 400 nm is used, the distance equal to one fourth of the light wavelength is approximately 100 nm. In the configuration of the conventional beam irradiation apparatus such as the exposure apparatus, it is extremely difficult to stably keep the interval between the focusing lens and the irradiation object at such a distance.

For example, in such a configuration that the above described SIL is attached to a servo actuator using an electromagnetic coil and focus servo is applied, it is now assumed that the servo gain thereof is approximately 40 dB and the substrate 11 having the irradiation object such as the photoresist layer 12 fluctuates by several $\mu$m. In this case, focusing remainder amounts to several tens nm. It is thus impossible to effect focus control stably with the distance between the exposed face and the plane face of the SIL being equal to approximately 100 nm as described above.

As a configuration for keeping the distance between the SIL and the irradiation object at a small value, there can be adopted an air slider configuration of dynamic pressure type in which the SIL is floated from the irradiation object by wind pressure caused by rotation of the irradiation object. In this case, a change of the rotation speed of the irradiation object causes a variation of the distance between the SIL and the irradiation object and a risk of collision between them.

As the beam irradiation apparatus, the exposure apparatus for fabricating an original disk which is used to obtain an information recording medium has been mainly described. However, there is the same problem also in a beam irradiation apparatus included in an optical apparatus for recording and/or reproducing information onto and/or from a high density information recording medium such as the above described optical disk, i.e., included in the so-called pickup apparatus.

SUMMARY OF THE INVENTION

The present invention enables a reliable and stable focus control even in the case where the irradiation object is disposed near the above described focusing lens using, for example, the SIL to such an extent that the irradiation object is disposed in the near-by field region.

In other words, an object of the present invention is to provide a beam irradiation apparatus capable of providing a minute beam spot, an optical apparatus having such a beam irradiation apparatus for an information recording medium, a method for fabricating an original disk for an information recording medium capable of thereby effecting high density recording, and a method for manufacturing an information recording medium.

According to an aspect of the present invention, there is provided a beam irradiation apparatus which includes a beam generation source for generating at least either of an optical beam, an electron beam and an ion beam, and a focusing lens for focusing a beam emitted from the beam generation source, in which the beam irradiation apparatus includes at least first and second focus control mechanisms each controlling a focus position of the beam with respect to the focusing lens or the same lens system forming the focusing lens in an overlapping fashion, so as to focus the beam onto an irradiation object by using the focusing lens.

Furthermore, according to another aspect of the present invention, there is provided an optical apparatus having a beam irradiation apparatus for conducting recording and/or reproducing with respect to an information recording medium includes the above described beam irradiation apparatus of the present invention.

Furthermore, according to a further aspect of the present invention, there is provided a method for manufacturing an original disk for an information recording medium, which is a method for manufacturing an original disk for an information recording medium, the original disk being used to fabricate an information recording medium having minute concaves and convexes formed thereon. An original disk for an information recording medium is obtained via an exposure step of conducting an exposure processing on a photoresist layer coated on a substrate of the original disk, by using a beam irradiation apparatus including a beam generation source for generating at least either of an optical beam, an electron beam and an ion beam, and a focusing lens for focusing a beam emitted from the beam generation source, and a development processing step of conducting a development processing on the photoresist layer.

Furthermore, according to a yet further aspect of the present invention, there is provided a method for manufacturing an information recording medium, which is a method for manufacturing an information recording medium having minute concaves and convexes formed thereon. The method comprises the steps of manufacturing an original disk, manufacturing a stamper by using the original disk and forming an information recording medium by using the stamper.

In this case, the step of manufacturing an original disk includes an exposure step of conducting an exposure processing on a photoresist layer coated on a substrate of the original disk, by using a beam irradiation apparatus comprising a beam generation source for generating at least either of an optical beam, an electron beam and an ion beam, and a focusing lens for focusing a beam emitted from the beam generation source, and a development processing step of conducting a development processing on the photoresist layer.

As described above, in the focus control for controlling the focus position of the beam in the present invention apparatus, for example, a coarse adjustment and a fine adjustment, i.e., focusing control in the low frequency band and focusing control in the high frequency band are conducted for the focusing lens or the same lens system forming the focusing lens, by control mechanisms of equal to or more than two stages including first and second control mechanisms. As a result, the focus position adjustment is conducted accurately and stably.

In the present invention method, an original disk is manufactured by using such a present invention apparatus, and an information recording medium is manufactured by using this original disk. Therefore, an excellent information recording medium capable of conducting a high-density recording can be obtained.

In Japanese Patent Application Laid-Open No. 4-184722, there is disclosed such a configuration that a focusing servo is conducted by using a lens having a small diameter and an objective lens. In the present invention, however, the first control and the second control are conducted for a common lens. As a result, position setting i.e., focusing can be controlled more accurately and easily. Especially in an adjustment in the near-by field region, therefore, position setting i.e., focusing can be controlled with high precision and stability.

DESCRIPTION OF THE PREFERRED EMBODIMENTS

A beam irradiation apparatus according to-the present invention includes a beam generation source for generating at least one of an optical beam, an electron beam and an ion beam, and a focusing lens for focusing a beam emitted from this beam generation source.

The focusing lens condenses the beam on the irradiation object. As regards the same lens system forming this focusing lens, at least first and second focus control mechanisms for controlling the focus position of the beam are provided in the present invention.

Figure 1:
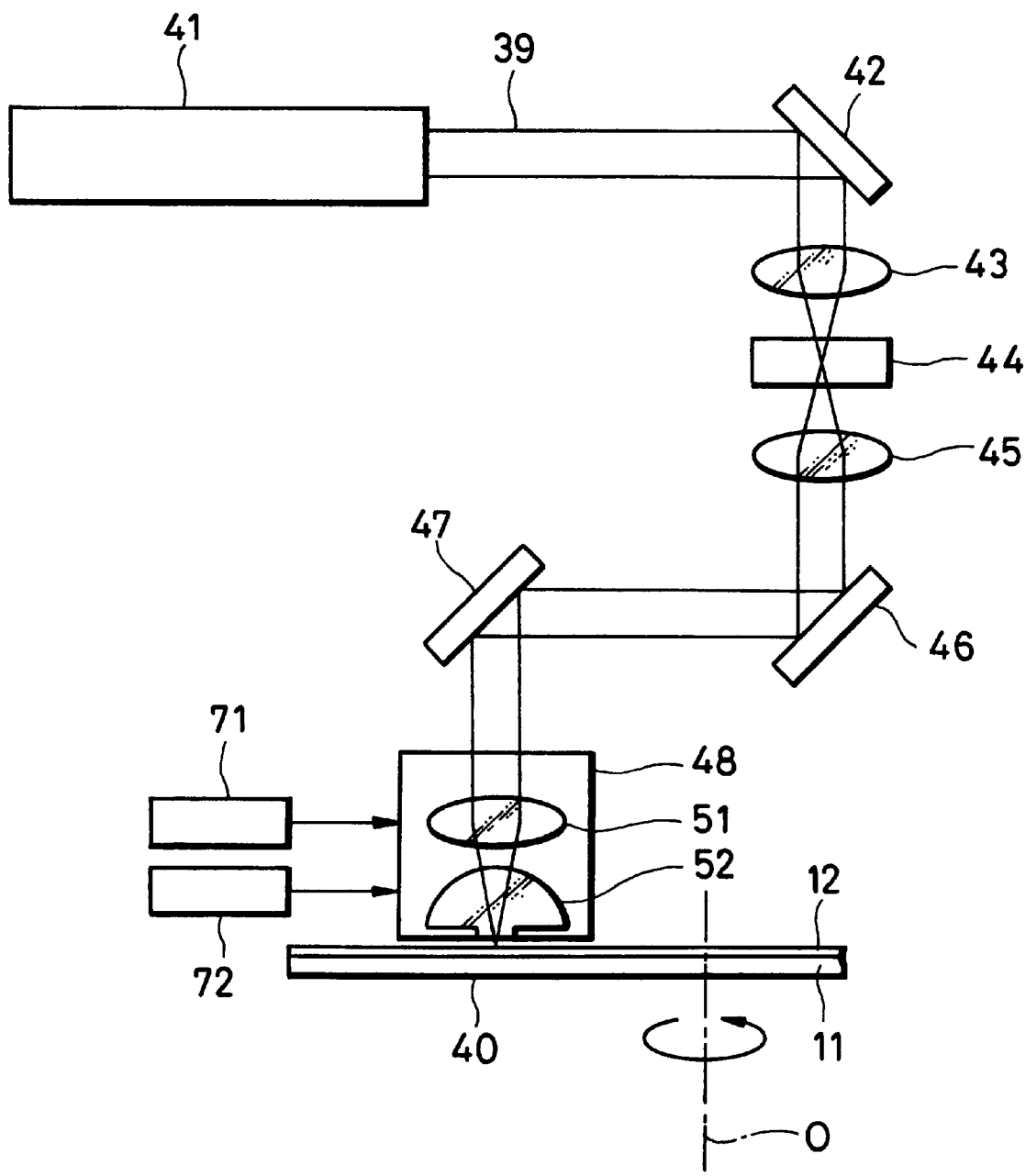
FIG. 1 is a schematic sectional view of an example of a beam irradiation apparatus according to the present invention.

FIG. 1 is a schematic configuration diagram showing an example of a beam irradiation apparatus according to the present invention. This beam irradiation apparatus can be applied to an exposure apparatus for irradiating an optical beam 39 such as a laser light on an irradiation object 40. For example, the beam irradiation apparatus can be applied to the exposure apparatus for fabricating the original disk which is used to obtain the stamper for fabricating an information recording medium described with reference to FIGS. 10 through 13.

In this case, the irradiation object 40 has such a configuration that the photoresist layer 12 is coated on the disklike substrate 11 forming the original disk. Then, the irradiation object 40 is held so that it may be rotated around its central axis O.

In this example, a beam generation source 41 is a laser light source for generating an optical beam by a laser light. An optical beam 39 by the laser light is focused on the irradiation object 40, or, in this example, the photoresist layer 12 on a substrate 11 forming an original disk, via a mirror 42, a condenser lens 43, a modulator 44, a collimator lens 45, mirrors 46 and 47, and a focusing lens 48.

Figure 14:
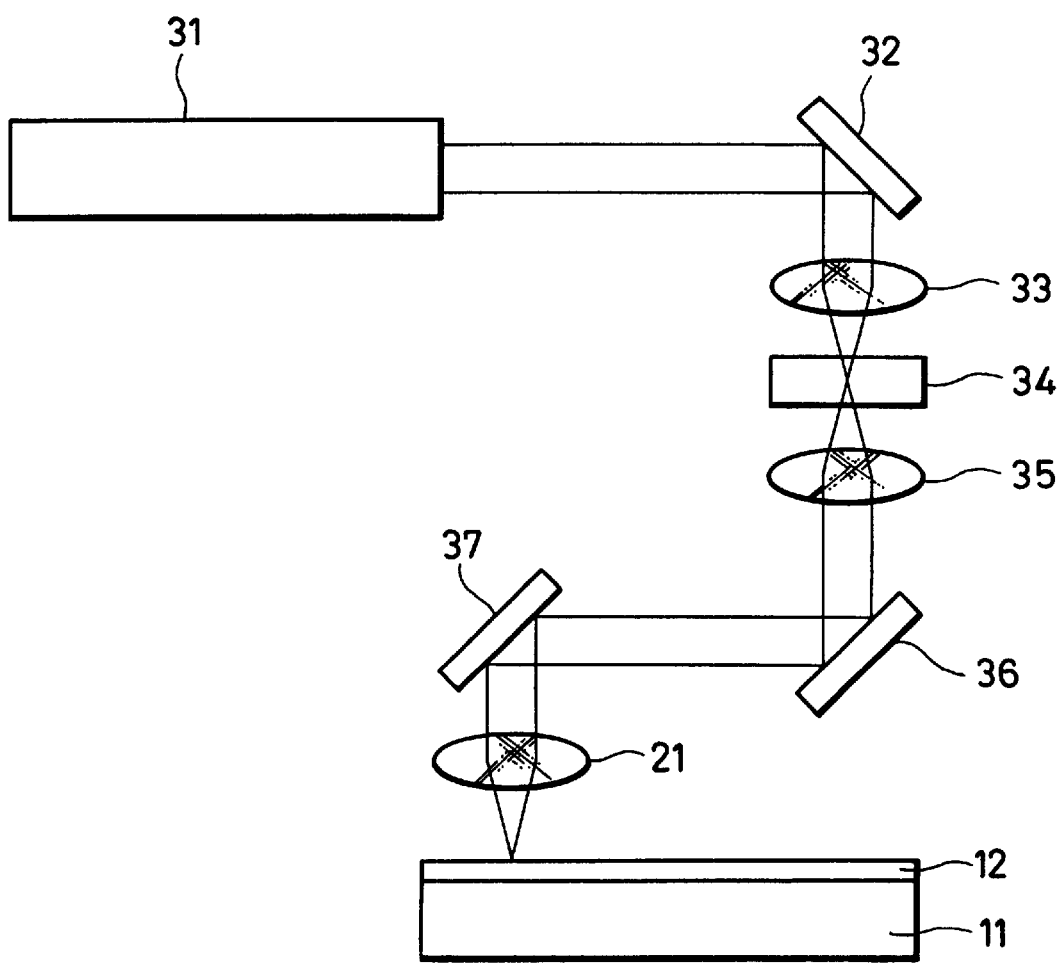
FIG. 14 is a configuration diagram of a beam irradiation apparatus forming a conventional exposure apparatus.

In the same way as the modulator 34 described with FIG. 14, the modulator 44 is formed of, for example, an AOM. The modulator 44 has a function of conducting the light intensity modulation of the beam, or concretely a function of turning on or off the beam corresponding to the irradiation object 40 or, in this example, a latent image of minute concaves and convexes to be finally obtained, i.e., an exposure pattern.

In other words, in this case as well, a compressional wave of a refractive index is formed in the optical crystal by making an ultrasonic wave incident on the optical crystal of the modulator 44 using the AOM. A diffraction grating formed by this compressional wave is formed. A laser beam obtained by the primary diffracted light of a laser beam generated by the beam generation source 41 and incident on the diffraction grating is used as an irradiation beam for the irradiation object 40, i.e., as an exposure optical beam.

Furthermore, the modulator 44 made of the AOM can be made to function as a deflector for deflecting the optical beam in a direction which is along the plane of the irradiation object 40 and which is perpendicular to the axis O. In this case, the position of the focus caused by the condenser lens 43 is somewhat deviated so as to generate a slight spread in the light incident on the optical crystal of the modulator 44. By changing the frequency of the ultrasonic wave applied to the optical crystal, the diffraction angle of the primary light is changed. As a result, deflection can be attained.

On the other hand, the focusing lens 48 can have a double lens configuration.

This focusing lens 48 can have, for example, such a configuration that an objective lens 51 is provided and a SIL 52 as described earlier is disposed at an final end. By thus using the SIL, the N.A. can be made large as described earlier. The irradiation object 40 must be disposed in such a position in the so-called near-by field region, i.e., in the light oozing region from the plane of the SIL 52 that the distance between the SIL 52 and the irradiation object 40 is equal to or less than $$\frac{\lambda \cdot \log_e 10}{2\pi\sqrt{(N.A.)^2 - 1}}$$

For example, when the N.A. is 1.8, the irradiation object must be disposed in such a position that the interval between them is equal to approximately one fourth of the wavelength $\lambda$.

This focusing lens 48 has focus control mechanisms of at least two stages, i.e., a first control mechanism 71 for conducting a focus control in a low frequency band and a second control mechanism 72 for conducting a focus control in a high frequency band.

Figure 2:
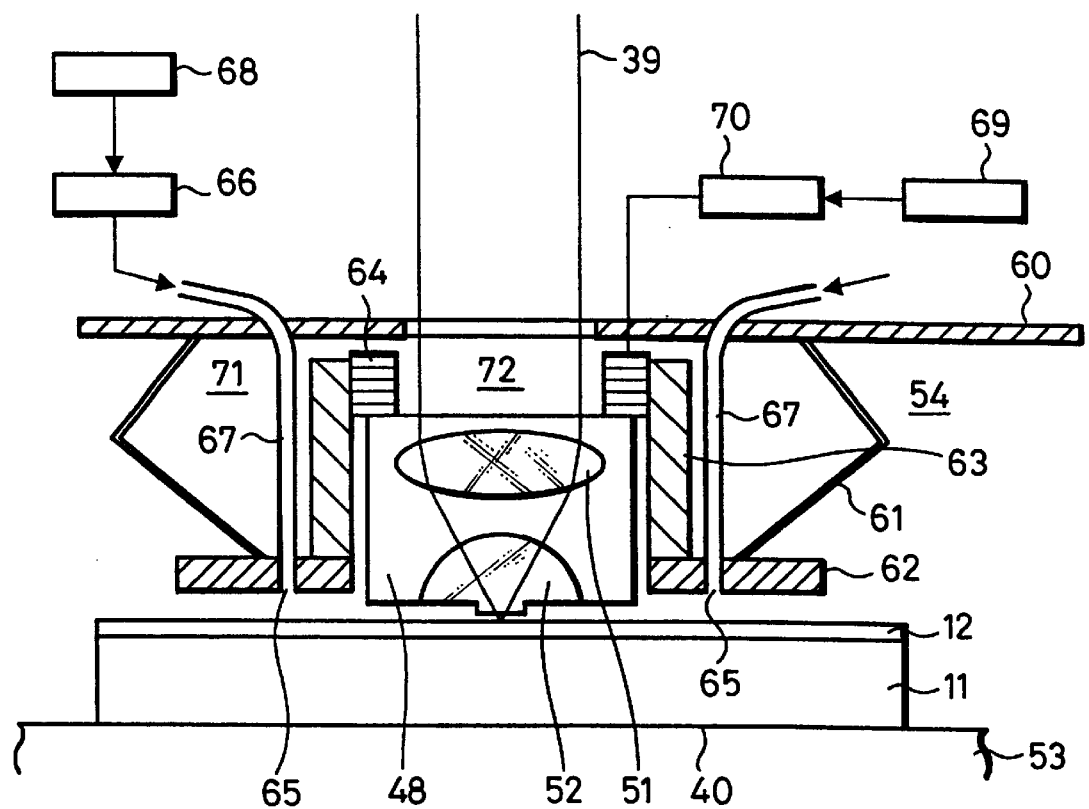
FIG. 2 is a schematic sectional view showing an example of a focusing lens of the beam irradiation apparatus according to the present invention.

FIG. 2 shows a schematic sectional view of the focusing lens 48. AS shown therein, the focusing lens 48 is disposed in an actuator 54 which is adjusted in position with respect to the irradiation object 40 taking the shape of, for example, a disk disposed on a rotating base 53. This actuator 54 includes the first control mechanism 71 and the second control mechanism 72.

In the focusing lens 48, the objective lens 51 and the SIL 52 are held in a lens barrel so as to be disposed on the same optical axis and with a predetermined position relation. The plane side face, i.e., the final end face of the SIL 52 has such a configuration that its central part is left and the rest is cut off, so that in the case where another component such as the irradiation object has inclined, collision therebetween can be avoided.

The actuator 54 includes an arm 60, an elastic body 61 such as a leaf spring or the like, and an air slider 62 attached to the arm via the elastic body. The air slider 62 is floated with respect to the irradiation object 40 by the intervention of an air layer. A support 63 for supporting the focusing lens 48 between the air slider 62 and the arm 60 is attached to the air slider 62. The support takes the shape of , for example, a cylinder.

On an opposite end side portion of the support 63 from the air slider 62, a displacement means 64 using, for example, a piezo stack is disposed. Via this displacement means 64, the focusing lens 48 is held within the support 63. The final end face of the SIL 52 is faced to a face of the air slider 62 opposed to the irradiation object 40.

In the face of the air slider 62 opposed to the irradiation object 40, a nozzle 65 from which jets the air is provided.

This nozzle 65 is supplied with high pressure air from a high pressure air supply source 66 through a pipe 67. There is thus formed a static pressure air slider in which the air slider 62 is floated from the irradiation object 40 at all times.

For the high pressure air supply source 66, a control means 68 for controlling, for example, its supply amount and pressure is provided. The control means conducts, for example, an initial coarse adjustment for opposing the final end face of the SIL 52, which is located at the final end of the focusing lens and nearly aligned with the face of the air slider 62 opposed to the irradiation object 40, to the irradiation object 40 with a required interval between them being kept. In this way, the first control mechanism 71 for selecting and determining the position of the focusing lens 48 is formed.

For example, the piezo stack comprising the displacement means 64 is supplied with a voltage from a voltage supply unit 70. By its displacement, i.e., its piezoelectric effect, the focusing lens 48 is adapted to be moved minutely along an axis of the support 63. The second control mechanism 72 for conducting a control of the position of the focusing lens 48 relative to the irradiation object 40, i.e., for conducting a focusing control is thus formed. The voltage supply unit 70 is adapted to supply a voltage depending on a focus error to, for example, the piezo stack comprising the displacement means 64 on the basis of a focus servo signal supplied from a detector 69 which detects the focus error.

In other words, the first focus control mechanism 71 in the above described configuration conducts, so to speak, a control in the low frequency band by means of the pressure control mechanism using the high pressure air, whereas the second focus control mechanism conducts, so to speak, a control in the high frequency band by means of the control mechanism an using an electric drive. The bands of the first and second focus control mechanisms overlap each other only in control a frequency of a part of the bands.

Focus position adjustment conducted relative to the irradiation object 40 by this actuator will now be described. First of all, a required voltage is applied to the piezo stack of the displacement means 64 to provide the focusing lens 48 with a displacement in such a direction as to detach the focusing lens from the irradiation object 40. In such a state, the supply of high pressure air from the high pressure air supply source 66 is controlled by the control means 68, and the high pressure air is jetted from the nozzle 65. While thus keeping the air slider 62 nearly horizontally, i.e., while keeping the air slider nearly parallel to the irradiation object 40, the arm 60 is lowered. By doing so, the pressure between the air slider 62 and the irradiation object 40 becomes high as the air slider 62 approaches the irradiation object 40. Because of the so-called air bearing obtained by the air existing between them, therefore, they do not collide with each other. The interval between the air slider 62 and the irradiation object 40 is always nearly kept at a value of, for example, 10 $\mu$m which is sufficiently larger than a required value, for example, 100 nm.

At this time, the interval between the focusing lens 48 and the irradiation object 40 is coarsely adjusted to become, for example, 20 $\mu$m. By controlling the displacement means 64 in this state, the focusing lens is brought close to the irradiation object 40 until the interval between them becomes, for example, 100 nm. In addition, the fine adjustment using the focusing servo in the high frequency band is conducted.

Figure 3:
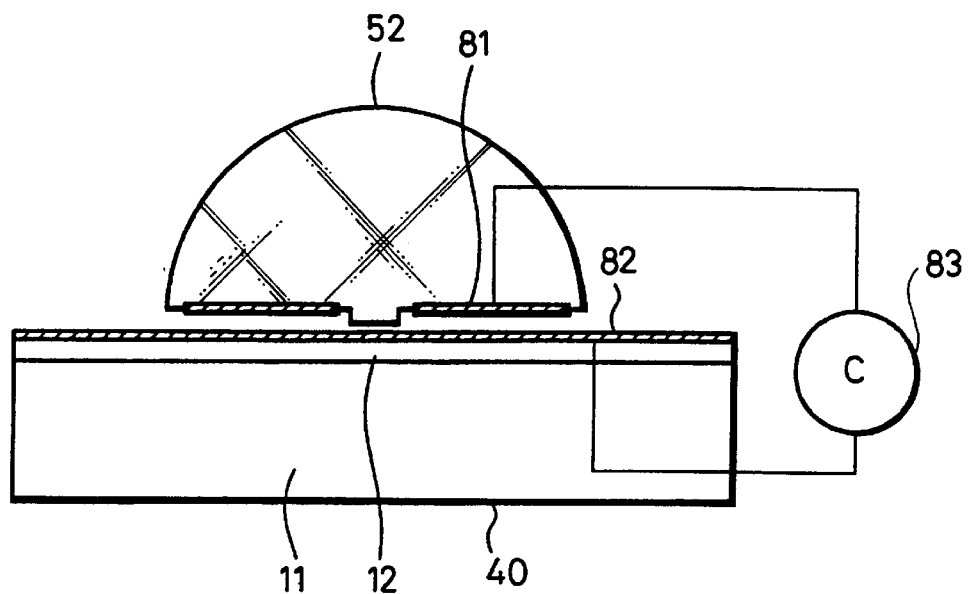
FIG. 3 is a schematic configuration diagram of an example of the focus error detector in the present invention apparatus.

The focus error detector 69 of the second focus control mechanism 72 can be formed of a detection means using, for example, a static capacitance. FIG. 3 shows the schematic configuration of one example of the detection means. A conductive film 81 such as an Al evaporated film or the like is formed on the face portion surrounding the flat face portion of the SIL 52 located at the final end of the focusing lens 48. On the other hand, on the surface of, for example, the photoresist layer 12 of the irradiation object 40, a semitransparent conductive film 82 made of, for example, an Al evaporated film which is thin to such an extent as to exhibit high transparency to the optical beam 39 is formed. A static capacitance increased as the distance between the conductive films 81 and 82 decreases is detected by a static capacitance detector 83.

A position detection signal of the focusing lens 48 thus detected is inputted to the voltage supply unit 70 of the above described second focus control mechanism 72. A voltage depending on the position detection signal is applied to the piezo stack of the displacement means 64. In this way, the focusing control for setting the interval between the focusing lens 48 and the irradiation object 40 to, for example, 100 nm, i.e., the focusing control in the near-by field region can be conducted.

Figure 4:
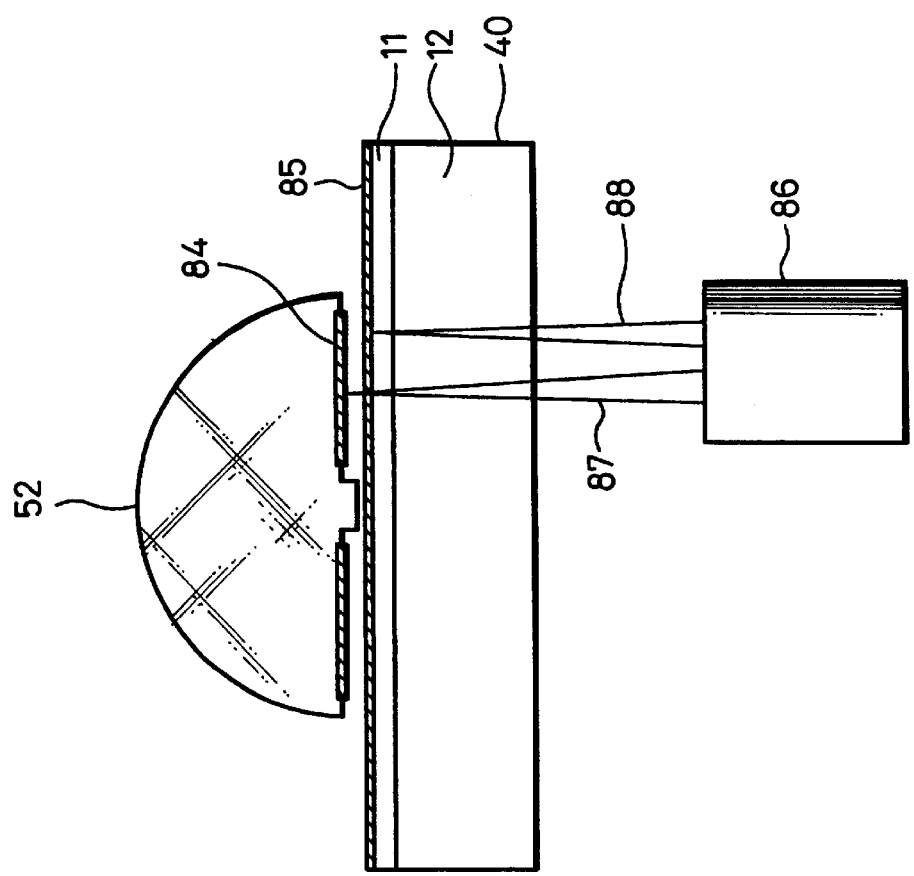
FIG. 4 is a schematic configuration diagram of another example of the focus error detector in the present invention apparatus.

FIG. 4 shows the schematic configuration of another example of the focus error detector 69. In this example, a laser Doppler configuration is used. In this case, a laser Doppler differential speedometer 86 is provided. A reflection film 84 such as an Al evaporated film or the like is formed on the peripheral face portion of the flat face portion of the SIL 52 located at the final end of the focusing lens 48. On the other hand, on the surface of, for example, the photoresist layer 12 of the irradiation object 40, a semitransparent reflection film 85 formed of, for example, an Al evaporated film which is thin is formed. By emitting two length measuring beams 87 and 88 from the laser Doppler differential speedometer 86, the interval between the SIL and the irradiation object is detected.

In this case as well, a detection signal thus detected is inputted to the voltage supply unit 70 to control the displacement means 64.

Figure 5:
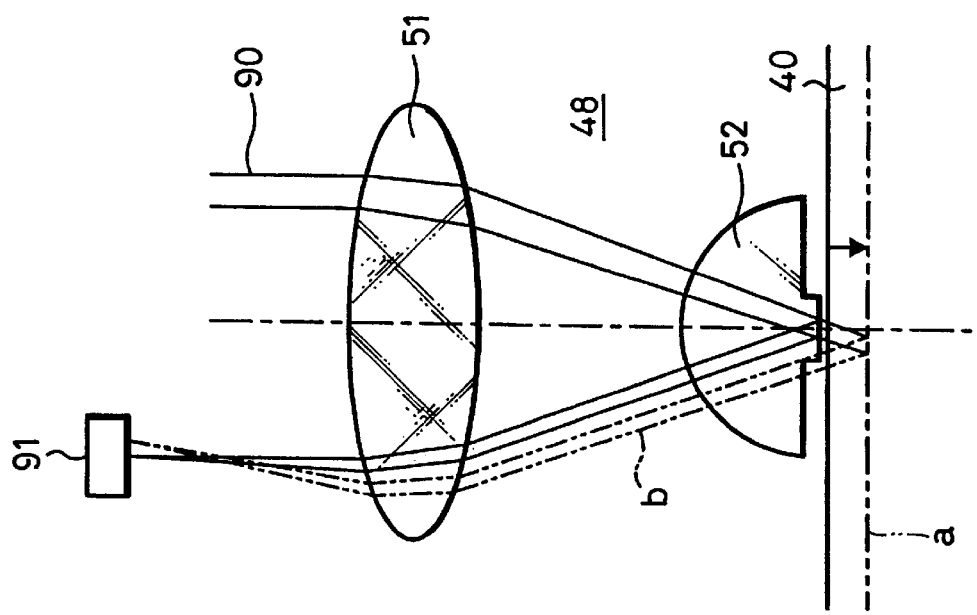
FIG. 5 is a schematic configuration diagram of a still another example of the focus error detector in the present invention apparatus.

FIG. 5 shows the schematic configuration of a still another example of the focus error detector 69. As shown in the figure, a configuration using a so-called off-axis method can be used. In this case, a beam 90 for detection which is different from the optical beam for conducting the desired light irradiation is incident on the focusing lens 48 in such a state that its axis is deviated from the optical axis. The detection beam is an optical beam such as a laser beam which is different in wavelength from the optical beam for the desired irradiation and which does not cause the inherent purpose of the light irradiation such as the exposure effect on the photoresist layer 12. The incidence angle of the detection beam 90 to the focusing lens 48 is deviated from the axis to such a degree that the detection beam is not reflected totally on the end face of the SIL.

In the focus position of the reflected light from the surface of the irradiation object 40 such as the surface of the photoresist layer 12, a detector 91 adapted to be capable of detecting the position is provided. The detector detects the focus position by using, for example, a one-dimensional position sensor. The detector is formed by arranging PSDs (Position Sensor Diodes), split photodiodes or the like.

In this case, refractive indexes of the end surface of the SIL 52 and the surface of the irradiation object 40 such as the surface of the photoresist layer 12 do not completely coincide with each other, even in the near-by field region where they come in physical contact with each other.

Therefore, an optical interface exists. As a result, a reflected light, i.e., return light of the detection beam 90 is obtained. If the surface of the irradiation object 40 is separated from the end face of the SIL 52 as indicated by a phantom line a, the return angle of the return light deflects as indicated by a phanton line b. An output change depending on the deflection angle can be obtained by using the detector 91. In other words, a focusing error signal can be detected from the detector 91.

By controlling the voltage supply unit for applying a voltage to, for example, the piezo stack of the displacement means 64 with the error signal, focusing control using fine adjustment of the position of the focusing lens 48 such as position control of approximately 100 nm, i.e., control of the near-by field region can be conducted.

Figure 6:
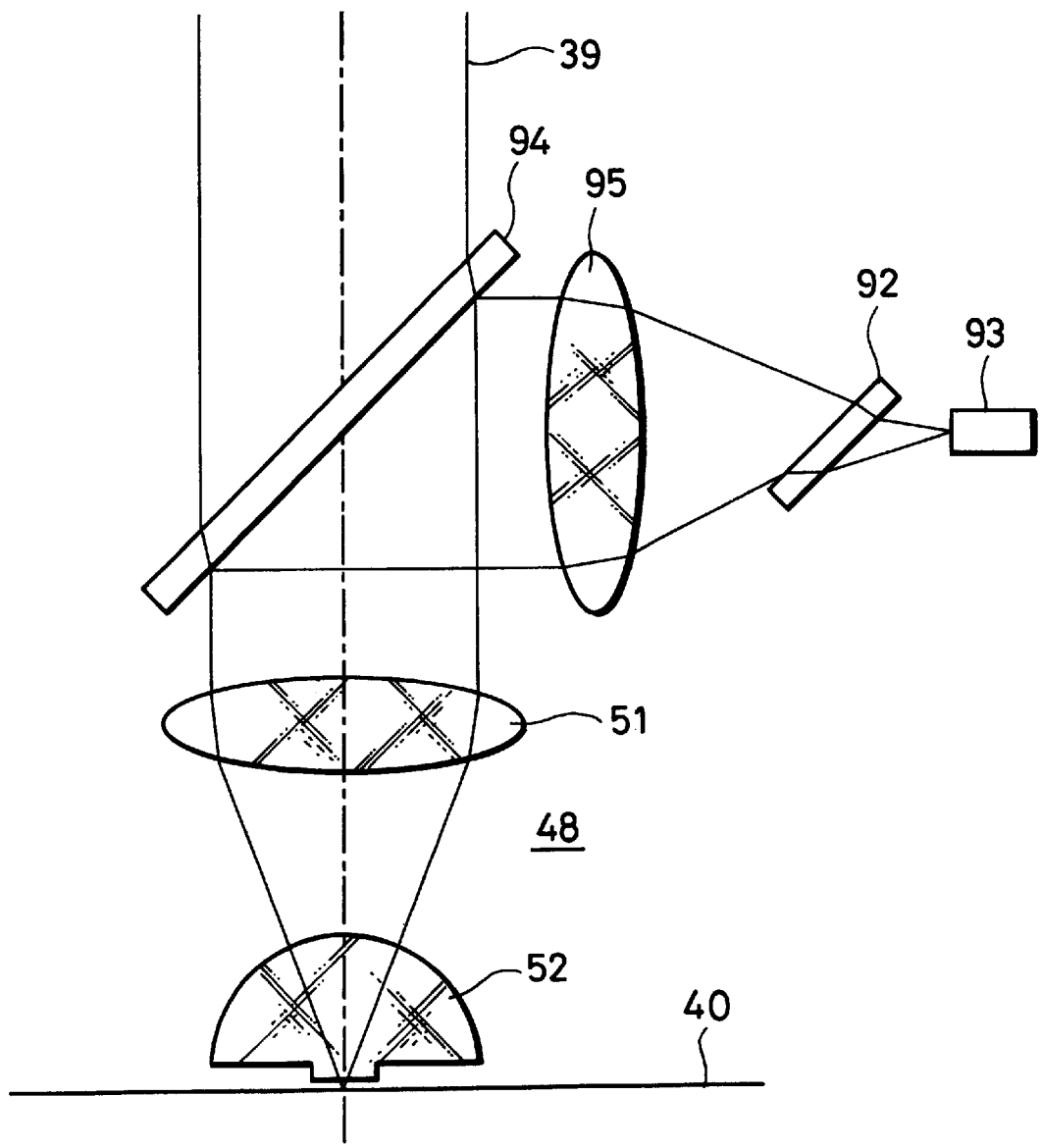
FIG. 6 is a schematic configuration diagram of a yet another example of the focus error detector in the present invention apparatus.

FIG. 6 shows the schematic configuration of an yet another example of the focus error detector 69. In this example, the mirror 46 or 47 shown in FIG. 1 is formed of a beam splitter 94. For example, a part of the return light from the irradiation object 40 is separated. In an optical path of the separated return light, a condenser lens 95 and a parallel plate 92 made of, for example, glass for providing astigmatism are disposed. The astigmatism, i.e., the beam spot shape is detected by a detector 93 having, for example, a quadrant photodiode. Thus the focusing error is detected. In other words, a focusing error signal is obtained.

In the above described beam irradiation apparatus, the coarse adjustment is conducted by the first control mechanism 71, and, in addition, the fine adjustment is conducted by the second control mechanism 72. In other words, position control, i.e., focusing adjustment in the low frequency band is conducted by the first control mechanism, and, in addition, position control, i.e., focusing adjustment in the high frequency band is conducted by the second control mechanism in a superimposing fashion. As a result, the focusing of the focusing lens 48 relative to the irradiation object 40 can be accomplished accurately and stably in the near-by field region having a minute interval of equal to or less than $$\frac{\lambda \cdot \log_e 10}{2\pi\sqrt{(N.A.)^2 - 1}},$$

such as 100 nm.

By the way, the above described beam irradiation apparatus is not limited to a beam irradiation apparatus used for exposure of the photoresist layer 12. It is also possible to form an optical apparatus serving as an optical recording apparatus which conducts information recording by using, as the irradiation object 40 shown in FIG. 1, a recordable information recording medium such as the so-called CD-R, a magneto optical recording medium having an optical magnetic recording layer, or an information recording medium having a recording layer for recording using phase changes. Or an optical apparatus serving as the so-called pickup apparatus for reproducing the information thus recorded may be formed.

Figure 7:
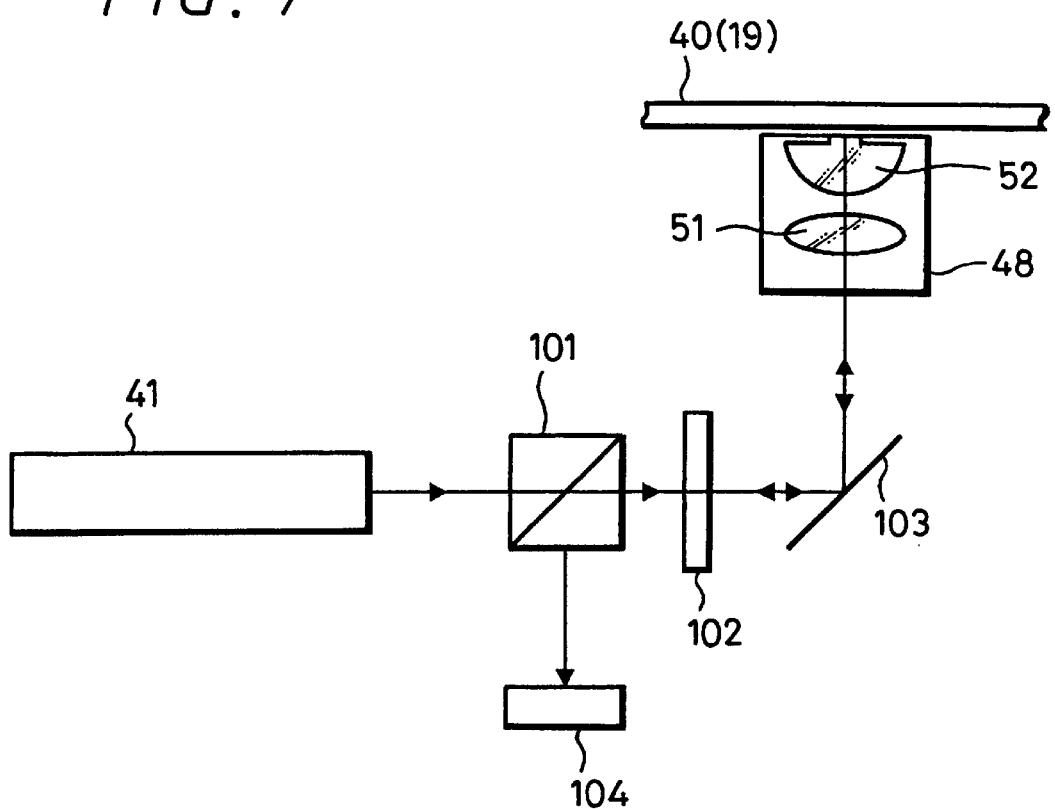
FIG. 7 is a schematic configuration diagram showing an example of a reproducing apparatus for an information recording medium using the beam irradiation apparatus according to the present invention.
Figure 8:
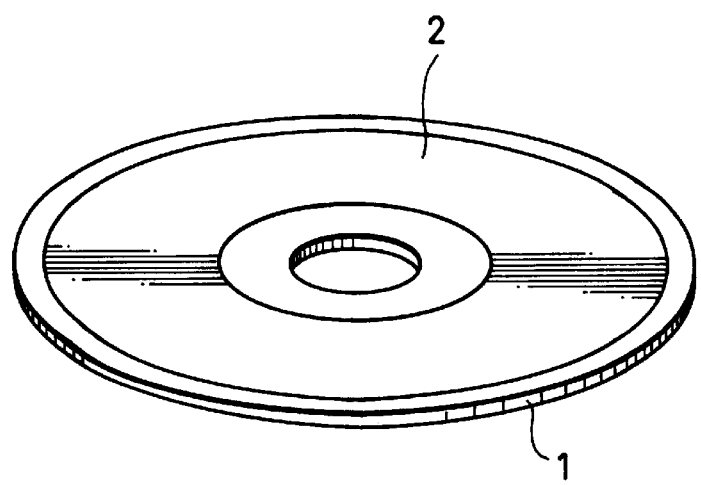
FIG. 8 is a perspective view of an example of an information recording medium.

FIG. 7 is a schematic configuration diagram of an example of an optical apparatus serving as a reproducing apparatus and having a configuration according to the configuration of the above described beam irradiation apparatus. In the optical apparatus, the irradiation object 40 is an information recording medium 19, and information recorded on the information recording medium is optically read out. In this optical apparatus as well, a beam generation source 41 for generating a laser beam is provided. A laser beam of a linearly polarized light obtained from the beam generation source is irradiated on the information recording medium 19 via, for example, a polarization beam splitter 101, a quarter-wave plate 102, a mirror 103, and the above described focusing lens 48. A return light modulated by the information of the information recording medium 19 is passed through the quarter-wave substrate 102 again via the focusing lens 48 and the mirror 103. By the quarter-wave plate, the return light is converted to a polarized light differing in polarization direction from the incident light by 90°. The polarized light is, for example, reflected by the polarization beam splitter 101. The optical path of the polarized light is thus separated. As a result, for example, light intensity, or light intensity according to the Kerr rotation angle is detected by a detection means 104. Reproduced output of the recorded information is thus obtained.

In this case as well, the position control of the focusing lens 48, i.e., the focusing control is conducted by the first and second control mechanisms 71 and 72 in the same configuration as that described with reference to FIGS. 1 through 6.

The beam irradiation apparatus according to the present invention and various components thereof, such as the focusing lens, the first and second control mechanisms, and the detection means of the control signals for controlling them are not limited to those of examples of the above described FIGS. 1 through 7, but may take various configurations.

For example, in the configurations shown in FIGS. 3 and 4, the conductive film 81 and the reflection film 84 are formed on the SIL 52. However, they may be disposed on the supporting portion of the focusing lens 48 such as the air slider 62 or the like.

Furthermore, in the present invention, the exposure processing for the photoresist layer 12 located on the substrate 11 is conducted by using the above described beam irradiation apparatus to fabricate the original disk for an information recording medium and fabricate the information recording medium using the same.

Figure 10A:
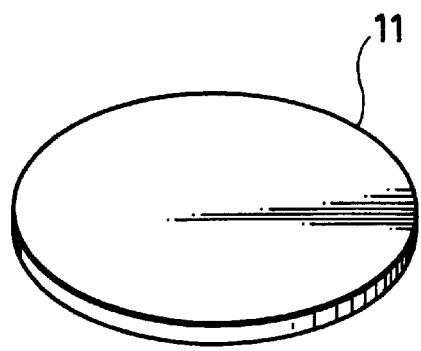
FIGS. 10A, 10B, and 10C are fabrication process diagrams of an original disk for fabricating a stamper for an information recording medium fabrication.
Figure 10B:
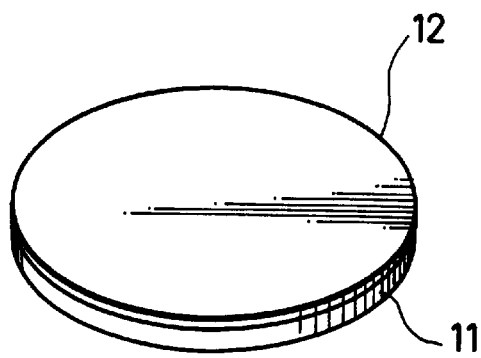

In other words, in the fabrication of an original disk for an information recording medium, a disklike substrate 11, such as a glass substrate, serving as a substrate of the original disk and having a smoothed mirror surface is prepared in the same way as the foregoing description made with reference to FIG. 10 (FIG. 10A). Onto the smooth mirror surface of this substrate 11, a photoresist layer 12 containing, for example, positive photoresist is coated by using the rotation coating method or the like so as to have a required thickness, such as a thickness of 0.1 $\mu$m (FIG. 10B).

Figure 10C:
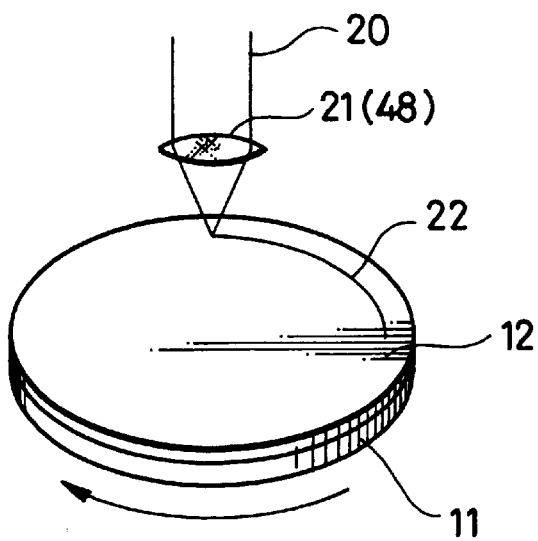

Then, this photoresist layer 12 is objected to exposure processing by using the beam irradiation apparatus according to the present invention described with reference to FIG. 1. In other words, while the substrate 11 is being rotated around its center axis, a laser light is focused onto the photoresist layer 12 by the above described focusing lens 48, and irradiated while it is relatively moved in the radial direction of the substrate 11. A latent image of minute concaves and convexes, i.e., a latent image 23 of a groove or pit is formed along a spiral line (FIG. 10C).

Figure 11A:
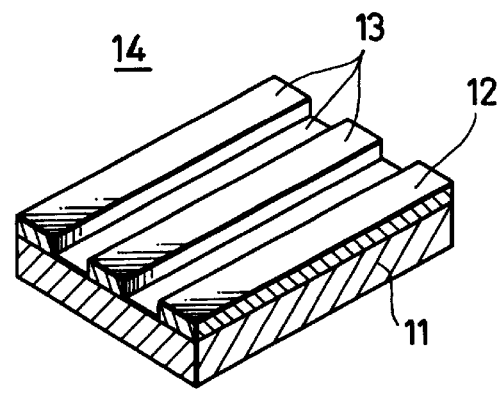
FIGS. 11A and 11B are perspective views of principal parts showing examples of an original disk for stamper fabrication.
Figure 11B:
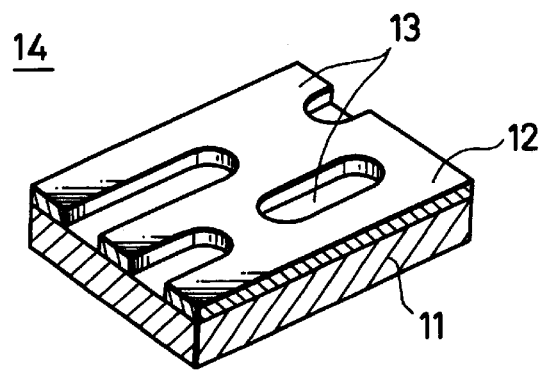

The photoresist layer 12 thus objected to the pattern exposure is developed. By doing so, there is obtained an information recording medium having minute concaves and convexes 13 each comprised of a groove or a pit formed by removing the photoresist layer 12 according to a predetermined exposure pattern. In this example, an original disk 14 for manufacturing optical disks is obtained. FIG. 11A or B shows a partial perspective view thereof.

Figure 12A:
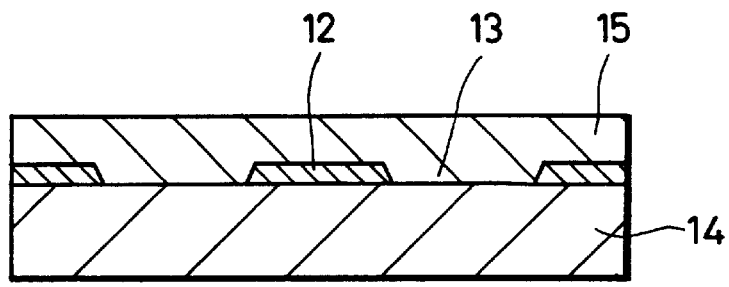
FIGS. 12A and 12B are process diagrams of stamper fabrication, respectively.
Figure 12B:
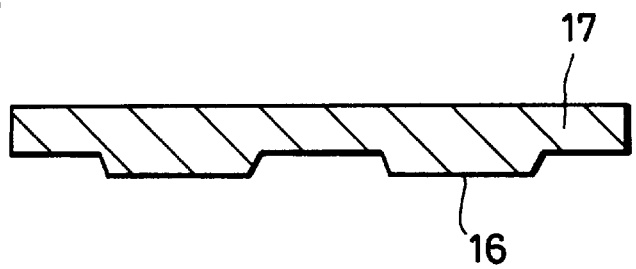

By using the original disk 14 thus formed, a stamper is fabricated. As for the fabrication of the stamper, a metal layer 15 is formed on the surface of the original disk 14 having the minute concaves and convexes 13 formed thereon by using a Ni plating (FIG. 12A). The metal layer 15 is exfoliated from the original disk 14 (FIG. 12B). In this way, a stamper 17 comprised of the metal layer 15 having minute concaves and convexes 16 formed by inverting in pattern the minute concaves and convexes 13 of the original disk 14 is formed.

Figure 9A:
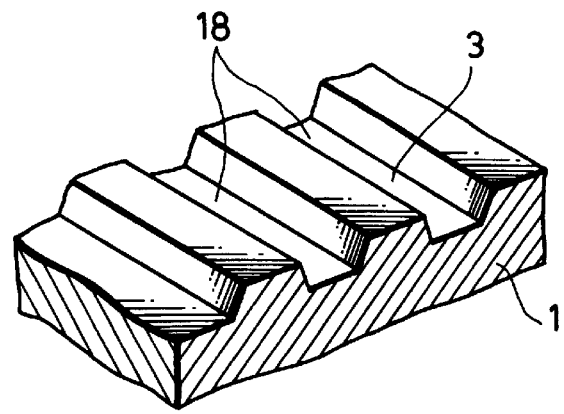
FIGS. 9A and 9B are perspective views of principal parts of the information recording medium, respectively.
Figure 9B:
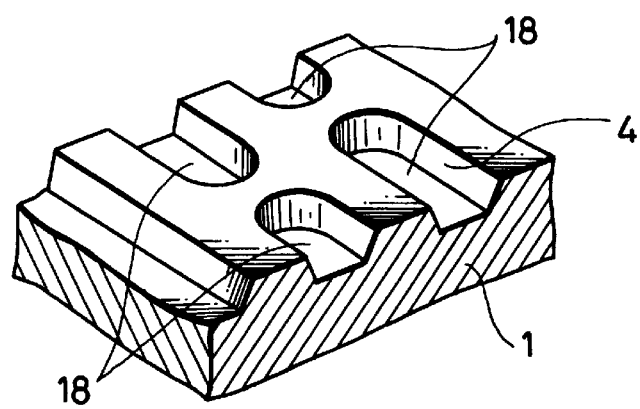
Figure 13A:
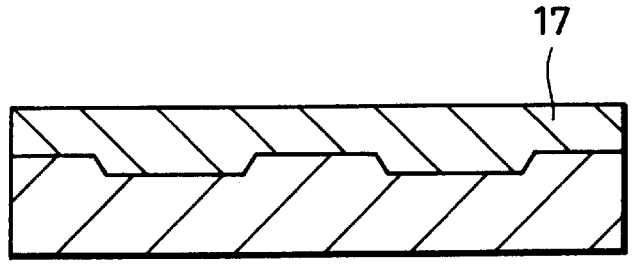
FIGS. 13A and 13B are fabrication process diagrams of an information recording medium, respectively.
Figure 13B:
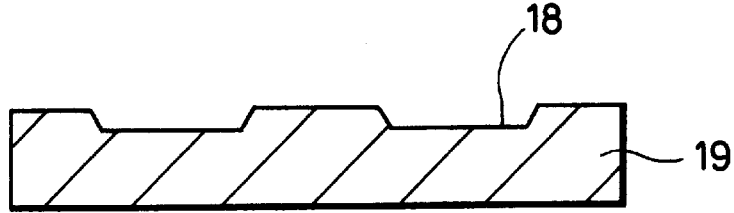

By using the stamper 17 thus formed, it is possible as shown in FIG. 13 to obtain an optical disk, i.e., an information recording medium 19, having minute concaves and convexes 18 inverted in pattern as compared with the minute concaves and convexes 16 of the stamper 17, i.e., having grooves 3 and pits 4 shown in FIGS. 9A and B, by using the above described injection molding or 2P method.

In this case as well, the stamper 17 has been formed from the original disk 14 by the Ni plating. An alternative method includes the steps of fabricating the so-called master from the original disk 14 by the Ni plating, fabricating the so-called mother by transferring the master, and fabricating a stamper by transfer from the mother.

In the above described example, there has been described the case where the beam generated from the beam generation source 41 is an optical beam such as a laser beam or the like. This beam may be an electron beam or an ion beam. In such a case, the optical system including the focusing lens or the like can be formed by using, for example, an electronic lens formed by an electric field and so on.

In the present invention, as described above, the coarse adjustment is conducted by the first control mechanism 71, and, in addition, the fine adjustment is conducted by the second control mechanism 72, as described above. In other words, the position control, i.e., focusing adjustment in the low frequency band is conducted by the first control mechanism, and, in addition, the position control, i.e., focusing adjustment in the high frequency band is conducted by the second control mechanism in a superimposed fashion. As a result, the focusing by the focusing lens 48 relative to the irradiation object 40 can be accomplished accurately and stably even in the near-by field region having the above described minute interval equal to or less than $$\frac{\lambda \cdot \log_e 10}{2\pi\sqrt{(N.A.)^2 - 1}},$$

such as 100 nm.

In the beam irradiation apparatus according to the present invention, accurate and stable setting is possible as described above, even if the beam irradiation apparatus has a double lens configuration and the SIL is used on the terminal end side, and even in the near-by field region having the above described minute interval equal to or less than $$\frac{\lambda \cdot \log_e 10}{2\pi\sqrt{(N.A.)^2 - 1}},$$

such as 100 nm, between the SIL and the irradiation object. As a result, the N.A. of the focusing lens can be set to a sufficiently large value. Therefore, the irradiation spot diameter can be set to a sufficiently small value.

In the case where the present invention apparatus is used as an exposure apparatus for fabricating an original disk for an information recording medium, minute concaves and convexes thereof can be formed accurately and with sufficient minuteness. Therefore, the information recording medium obtained by using the present invention method and fabricated by using the stamper obtained from the original disk can be obtained as a high density recording medium having the excellent performance.

Furthermore, in the present invention, the position adjustment and hence the focusing control of a common focusing lens are conducted by control mechanisms at a plurality of stages. Therefore, there can be avoided difficulty of focus control and complexity of the apparatus caused in the case where position control of each of a plurality of lenses is individually conducted. A high precision, reliable, and stable beam irradiation apparatus can be formed.

By forming the beam irradiation apparatus according to the configuration of the present invention as an optical apparatus for conducting recording and/or reproducing with respect or any one of them to an information recording medium, i.e., a pickup apparatus, therefore, a pickup apparatus having excellent recording and reproducing characteristics can be formed.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. In a beam irradiation apparatus comprising a beam generation source for generating at least one of an optical beam, an electron beam, and an ion beam, and a focusing lens for focusing a beam emitted from the beam generation source, comprising:

at least first and second focus control mechanisms each controlling a focus position of the beam with respect to the focusing lens or the same lens system forming the focusing lens, so as to focus the beam onto an irradiation object by using the focusing lens in an overlapping fashion wherein said first and second focus control mechanisms control the focus position of the beam in at least partially different frequency bands.

2. A beam irradiation apparatus according to claim 1, characterized in that the first focus control mechanism comprises a control mechanism for conducting focus control in a low frequency band, whereas the second focus control mechanism comprises a control mechanism for conducting focus control in a high frequency band.

3. A beam irradiation apparatus according to claim 1, characterized in that the first and second focus control mechanisms comprise control mechanisms for conducting focus control in different frequency bands overlapping each other only in partial bands.

4. A beam irradiation apparatus according to claim 1, characterized in that the first focus control mechanism comprises a pressure control mechanism using high pressure air, whereas the second focus control mechanism comprises a control mechanism using an electric drive.

5. A beam irradiation apparatus according to claim 1, characterized in that the first focus control mechanism comprises a focus control mechanism for always floating an actuator by using high pressure air, the actuator holding the focusing lens and conducting position control of the focusing lens, whereas the second focus control mechanism comprises a control mechanism for conducting fine adjustment of the actuator using an electric drive.

6. A beam irradiation apparatus according to claim 1, characterized in that a beam for focus detection different from the beam is made to be incident on the focusing lens in such a state that its axis is deviated from an axis of the focusing lens, and to be irradiated on the irradiation object, a deflection angle of a return light from the irradiation object is detected, and a resultant detection signal is supplied to the second focus control mechanism as a focus control signal.

7. A beam irradiation apparatus according to claim 1, characterized in that a part or whole of a return light of the beam from the irradiation object is provided with astigmatism, its spot shape is detected, and a resultant detection signal is supplied to the second focus control mechanism as a focus control signal.

8. A beam irradiation apparatus according to claim 1, characterized in that a distance between the focusing lens or its supporting portion and the irradiation object is detected as a static capacitance, and a resultant detection signal is supplied to the second focus control mechanism as a focus control signal.

9. A beam irradiation apparatus according to claim 1, characterized in that a distance between the focusing lens or its supporting portion and the irradiation object is detected by using a laser beam Doppler method, and a resultant detection signal is supplied to the second focus control mechanism as a focus control signal.

10. A beam irradiation apparatus according to claim 1, characterized in that a distance between the focusing lens or its supporting portion and the irradiation object is detected by using a laser displacement meter, and a resultant detection signal is supplied to the second focus control mechanism as a focus control signal.

11. A beam irradiation apparatus according to claim 1, characterized in that the irradiation object is a rotating circular plate.

12. A beam irradiation apparatus according to claim 1, characterized in that the irradiation object is a substrate of an original disk for an information recording medium coated with applied to a photoresist layer, and the beam is focused on the photoresist layer.

13. A beam irradiation apparatus according to claim 1, characterized in that the focusing lens of the beam comprises a double lens.

14. A beam irradiation apparatus according to claim 1, characterized in that the irradiation object is disposed near a final end face of a lens forming the focusing lens to such an extent that the irradiation object comes in a near-by field region.

15. A beam irradiation apparatus according to claim 1, characterized in that a distance between the irradiation object and a final end face of a lens forming the focusing lens is equal to or less than $$\lambda \cdot \log_e 10/(2\pi\sqrt{(N.A.)^2-1})$$

where $\lambda$ is a wavelength of the beam, $\pi$ is the ratio of the circumference of a circle to its diameter, and N.A. is a numerical aperture of the focusing lens (N.A.>1.0).

16. A beam irradiation apparatus according to claim 1, characterized in that a lens at a final stage of the focusing lens comprises a SIL (Solid Immersion Lens).

17. An optical apparatus having a beam generation source and a focusing lens for focusing a beam emitted from the beam generation source, characterized in that the beam irradiation apparatus comprises at least first and second focus control mechanisms each controlling a focus position of the beam with respect to the focusing lens or the same lens system forming the focusing lens in an overlapping fashion, so as to focus the beam onto an information recording medium by using the focusing lens, wherein said first and second focus control mechanisms control the focus position of the bean in at least partially different frequency bands.

18. An information optical apparatus having a beam irradiation apparatus for an information recording medium according to claim 17, characterized in that the first focus control mechanism comprises a control mechanism for conducting focus control in a low frequency band, whereas the second focus control mechanism comprises a control mechanism for conducting focus control in a high frequency band.

19. An optical apparatus having a beam irradiation apparatus for an information recording medium according to claim 17, characterized in that the first and second focus control mechanisms comprise control mechanisms for conducting focus control in different frequency bands overlapping each other only in partial bands.

20. An optical apparatus having a beam irradiation apparatus for an information recording medium according to claim 17, characterized in that the first focus control mechanism comprises a pressure control mechanism using a high pressure air, whereas the second focus control mechanism comprises a control mechanism using an electric drive.

21. An optical apparatus having a beam irradiation apparatus for an information recording medium according to claim 17, characterized in that the first focus control mechanism comprises a focus control mechanism for always floating an actuator by using a high pressure air, the actuator holding the focusing lens and conducting a position control of the focusing lens, whereas the second focus control mechanism comprises a control mechanism for conducting a fine adjustment of the actuator using an electric drive.

22. An optical apparatus having a beam irradiation apparatus for an information recording medium according to claim 17, characterized in that a beam for focus detection different from the beam is made to be incident on the focusing lens in such a state that its axis is deviated from an axis of the focusing lens, and to be irradiated on the information recording medium, a deflection angle of a return light from the information recording medium is detected, and a resultant detection signal is supplied to the second focus control mechanism as a focus control signal.

23. An optical apparatus having a beam irradiation apparatus for an information recording medium according to claim 17, characterized in that a part or whole of a return light of the beam from the information recording medium is provided with astigmatism, its spot shape is detected, and a resultant detection signal is supplied to the second focus control mechanism as a focus control signal.

24. An optical apparatus having a beam irradiation apparatus for an information recording medium according to claim 17, characterized in that a distance between the focusing lens or its supporting portion and the information recording medium is detected as a static capacitance, and a resultant detection signal is supplied to the second focus control mechanism as a focus control signal.

25. An optical apparatus having a beam irradiation apparatus for an information recording medium according to claim 17, characterized in that a distance between the focusing lens or its supporting portion and the information recording medium is detected by using a laser beam Doppler method, and a resultant detection signal is supplied to the second focus control mechanism as a focus control signal.

26. An optical apparatus having a beam irradiation apparatus for an information recording medium according to claim 17, characterized in that a distance between the focusing lens or its supporting portion and the information recording medium is detected by using a laser displacement meter, and a resultant detection signal is supplied to the second focus control mechanism as a focus control signal.

27. An optical apparatus having a beam irradiation apparatus for an information recording medium according to claim 17, characterized in that the focusing lens of the beam comprises a double lens.

28. An optical apparatus having a beam irradiation apparatus for an information recording medium according to claim 17, characterized in that the information recording medium is disposed near a final end face of a lens forming the focusing lens to such an extent that the information recording medium comes in a near-by field region.

29. An optical apparatus having a beam irradiation apparatus for an information recording medium according to claim 17, characterized in that a distance between the information recording medium and a final end face of a lens forming the focusing lens is equal to or less than $$\lambda \cdot \log_e 10 / (2\pi\sqrt{(N.A.)^2 - 1})$$

where $\lambda$ is a wavelength of the beam, $\pi$ is the ratio of the circumference of a circle to its diameter, and N.A. is a numerical aperture of the focusing lens.

30. An optical apparatus having a beam irradiation apparatus for an information recording medium according to claim 17, characterized in that a lens at a final stage of the focusing lens comprises a SIL (Solid Immersion Lens).

31. In a method for manufacturing an original disk for fabricating an information recording medium on which fine concave and convex are formed, the method for manufacturing an original disk of an information recording medium characterized in that an original disk for information recording media is obtained by:

an exposure step of conducting an exposure processing on a photoresist layer coated on a substrate of the original disk by using a beam irradiation apparatus comprising a beam generation source for generating at least one of an optical beam, an electron beam and an ion beam, and a focusing lens for focusing a beam emitted from the beam generation source; and a development processing step of conducting a development processing on the photoresist layer, wherein
a first focus control mechanism and a second focus control mechanism associated with said focusing lens control a focus position of said beam in at least partially different frequency bands.

32. A method for manufacturing an information recording medium having minute concave and convex formed thereon, comprising:

manufacturing an original disk, a step of manufacturing a stamper by using the original disk, and a step of forming an information recording medium by using the stamper; and manufacturing an original disk comprises an exposure step of conducting an exposure processing on a photoresist layer coated on a substrate of the original disk by using a beam irradiation apparatus comprising a beam generation source for generating at least either of an optical beam an electron beam and an ion beam, and a focusing lens for focusing a beam emitted from the beam generation source, and a development processing step of conducting a development processing on the photoresist layer, wherein
a first focus control mechanism and a second focus control mechanism associated with said focusing lens control a focus position of said beam in at least partially different frequency bands.

* * * * *